US009832055B2

United States Patent
Kuschnerov et al.

(10) Patent No.: US 9,832,055 B2
(45) Date of Patent: Nov. 28, 2017

(54) METHOD AND ARRANGEMENT FOR TRANSMITTING AN OPTICAL TRANSMISSION SIGNAL WITH REDUCED POLARISATION-DEPENDENT LOSS

(75) Inventors: Maxim Kuschnerov, München (DE); Bernhard Spinnler, Oberhaching (DE); Berthold Lankl, Egmating (DE); Antonio Napoli, München (DE)

(73) Assignee: Xieon Networks S.a.r.l., Luxembourg (LU)

( * ) Notice: Subject to any disclaimer, the term of this patent is extended or adjusted under 35 U.S.C. 154(b) by 0 days.

(21) Appl. No.: 13/515,851

(22) PCT Filed: Dec. 15, 2009

(86) PCT No.: PCT/EP2009/067183
§ 371 (c)(1),
(2), (4) Date: Sep. 21, 2012

(87) PCT Pub. No.: WO2011/072720
PCT Pub. Date: Jun. 23, 2011

(65) Prior Publication Data
US 2013/0051801 A1    Feb. 28, 2013

(51) Int. Cl.
| | | |
|---|---|---|
| H04B 10/04 | (2006.01) |
| H04B 10/12 | (2006.01) |
| H04B 10/00 | (2013.01) |
| H04L 27/20 | (2006.01) |
| H04B 10/2507 | (2013.01) |

(Continued)

(52) U.S. Cl.
CPC ...... H04L 27/2096 (2013.01); H04B 10/2507 (2013.01); H04B 10/2569 (2013.01); H04B 10/2572 (2013.01); H04B 10/50 (2013.01); H04B 10/66 (2013.01); H04L 27/2697 (2013.01)

(58) Field of Classification Search
None
See application file for complete search history.

(56) References Cited

U.S. PATENT DOCUMENTS 5,491,576 A * 2/1996 Bergano ............ H04B 10/2572
                                                 398/147
6,459,831 B1   10/2002 Cao et al. ................ 385/24
(Continued)

FOREIGN PATENT DOCUMENTS

JP   8-166563 A2    6/1996
WO   WO 02/35278 A1   5/2002

OTHER PUBLICATIONS

Cvijetic, Milorad, Optical Transmission:systems engineering, 2004, Artech House, Inc. p. 218-219.*
(Continued)

*Primary Examiner* — Ken N Vanderpuye
*Assistant Examiner* — Jai Lee
(74) *Attorney, Agent, or Firm* — Nelson Mullins Riley & Scarborough LLP (57) ABSTRACT

The invention describes a method and an arrangement for transmitting an optical transmission signal with reduced polarization-dependent loss. A first transmission signal component and a second orthogonal transmission signal component of the optical transmission signal are transmitted with a time difference between said transmission signal components.

12 Claims, 7 Drawing Sheets

(51) Int. Cl.
*H04B 10/2569* (2013.01)
*H04B 10/50* (2013.01)
*H04B 10/66* (2013.01)
*H04L 27/26* (2006.01)

(56) References Cited

U.S. PATENT DOCUMENTS

| | | | | |
|---|---|---|---|---|
| 6,542,271 | B1 * | 4/2003 | Gehlot | H04B 10/2507 398/152 |
| 6,850,712 | B1 * | 2/2005 | Delavaux et al. | 398/201 |
| 7,031,614 | B2 * | 4/2006 | Fujiwara | G02F 1/0136 398/152 |
| 7,382,985 | B2 * | 6/2008 | Roberts | H04B 10/25137 398/147 |
| 7,398,022 | B2 * | 7/2008 | Zitelli | H04B 10/505 398/141 |
| 2003/0175033 | A1 * | 9/2003 | Taga | H04B 10/2572 398/152 |
| 2004/0061856 | A1 | 4/2004 | Clark et al. | 356/334 |
| 2004/0105682 | A1 * | 6/2004 | Roberts | H04B 10/25137 398/147 |
| 2006/0176472 | A1 | 8/2006 | Andrekson et al. | 356/73.1 |
| 2007/0166046 | A1 * | 7/2007 | Hecker et al. | 398/154 |
| 2009/0257755 | A1 * | 10/2009 | Buelow | H04B 10/505 398/184 |
| 2010/0007952 | A1 * | 1/2010 | Krummrich | G02B 6/272 359/484.01 |
| 2010/0111531 | A1 * | 5/2010 | Tanimura | H04B 10/5055 398/65 |
| 2011/0064421 | A1 * | 3/2011 | Zhang et al. | 398/208 |
| 2011/0305453 | A1 * | 12/2011 | Hauske | H04B 10/2513 398/38 |
| 2013/0142507 | A1 * | 6/2013 | Mandai | G02B 6/26 398/25 |

OTHER PUBLICATIONS

Webb et al., Handbook of Laser Technology and Applications, 2004, IOP Publishing Ltd., vol. III, p. 2253.*
Ray et al., Information Technology: Principles and Applications, 2004, Prentice-Hall of India Private Limited, p. 57-58.*
Charlet, Gabriel, Coherent detection associated with digital signal processing for fiber optics communicaiton, 2008, Elsevier, pp. 1012-1030.*
Mecozzi, A., et al., "The Statistics of Polarization-Dependent Loss in Optical Communication Systems", © 2002 IEEE, 3 pgs.
Duthel, T., et al., "Impact of Polarisation Dependent Loss on Coherent POLMUX-NRZ-DQPSK", OFC/NFOEC 2008, 3 pgs.

* cited by examiner

METHOD AND ARRANGEMENT FOR TRANSMITTING AN OPTICAL TRANSMISSION SIGNAL WITH REDUCED POLARISATION-DEPENDENT LOSS

FIELD OF THE INVENTION

The invention refers to a method and to an arrangement for transmitting an optical transmission signal with reduced polarisation-dependent loss.

BACKGROUND OF THE INVENTION

Polarization-dependent loss (PDL) is an impairment in a fiber optic channel that leads to a loss of performance, and, in contrast to chromatic dispersion (CD) or polarisation mode dispersion (PMD), cannot be fully compensated.

PDL usually originates in components like optical isolators, circulators, optical amplifiers or WDM (wavelength division multiplex) couplers. The PDL of a single element is usually low. However, depending on the time-dependent polarization rotation in between the PDL elements, the instant PDL value can reach rather high values. For N PDL-elements in the system, the mean PDL over time is given by A. Mecozzi, A. Shtaif, "The Statistics of Polarization-Dependent Loss in Optical Communication Systems", *IEEE Photonics Technology Letters*, vol. 14, pp. 313-315, 2002:

$$(PDL) = \sqrt{\frac{8N}{3\pi}} \Delta\alpha,$$

where $\Delta\alpha$ is the PDL[dB] per element and (PDL) is the expectation PDL value. It was shown that the probability distribution of PDL is Maxwellian for a large number of PDL elements. Here, the probability for the PDL to surpass a certain threshold is P(PDL>2(PDL))=1.7%, and P(PDL>3(PDL))=4.2×10⁻⁵, corresponding to 22 minutes per year. Assuming an optical link with 20 spans of fiber and 20 spans of optical dispersion compensating elements, 5 PDL elements per span with $\Delta\alpha$=0.15 dB, the mean PDL would be 1.95 dB. This means that the instant PDL can on average exceed almost 6 dB in 22 minutes per year.

Depending on the polarization of the input signal, a worst and best case performance can be defined, as given by T. Duthel et al. for polmux signals, "Impact of Polarization-Dependent Loss on Coherent POLMUX-NRZ-DQPSK", San Diego, Calif., OThU5, 2008. If the channel is known at the transmitter, the signal can be aligned to yield best case performance. This would however require a feedback channel, which is usually not given in an optical system. Furthermore, it is possible to scramble the state of polarization (SOP) of the signal, leading to a time-averaging over different performance levels depending on the polarization alignment of the signal in regard to the PDL axis. The performance of SOP-scrambling leads to a limited performance improvement of 0.5 dB at 6 dB PDL for polarization multiplexed signals. So far, no elaborate PDL mitigation technique for coherent polarization multiplexed systems was presented.

OBJECTS AND SUMMARY OF THE INVENTION

Therefore, it is an object of the present invention to provide a method and an arrangement for transmitting a transmission signal with a reduced detrimental effect of polarisation-dependent loss.

According to the present invention, a method is provided for transmitting a transmission signal with reduced polarisation-dependent loss, wherein a first transmission signal component and a second orthogonal transmission signal component of the optical transmission signal are transmitted with a time difference between said transmission signal components.

The transmission signal is split into orthogonal polarized transmission signal components, which are transmitted with a time difference. These features improve the chance that only a single signal component of the transmission signal is impaired.

Best results are achieved when the orthogonal transmission signal components of the transmission signal are transmitted with equal power.

This feature is achieved by splitting the transmission signal exactly into two equal signal components with orthogonal polarisation.

It is advantageous that the orthogonal transmission signal components are transmitted with a time delay of one half of a modulation section.

The delay time of one half of a modulation section (symbol duration) is usually sufficient for receiving a very good result. Any amount of the time delay would improve the PDL. On the other hand, a longer time delay of e.g. 1.5, 2.5, . . . would complicate the reconstruction of a standard polmux signal transmitting two different data signals or corresponding signal values.

It is advantageous that the first transmission signal component and the second orthogonal transmission signal component of a polmux transmission signal are generated by component modulation signals derived from DGD (differential group delay) pre-distorted electrical modulation signals.

The generation of the transmission signal components according to the invention is reduced to signal processing in the electrical domain, which can be implemented easier and cheaper.

For today's transmission systems, it is advantageous that the first transmission signal component and the second orthogonal transmission signal component of a polmux transmission signal are generated by electrical component modulation signals derived by digital DGD pre-distorting and converting complex signal values into DGD pre-distorted modulation values and then converting said DGD pre-distorted modulation values into said electrical component modulation signals.

For today's transmission systems, it is also advantageous that a transmitter arrangement comprises a DGD pre-distortion unit and signal converters for converting signal values into electrical component modulation signals and modulation units for modulating an optical carrier signal by electrical component modulation signals generating orthogonal transmission signal components of a polmux signal, both transmission signal components comprising information from said signal values.

The transmitter features are often implemented by electrical components or even preferable by digital processing. Especially digital processors enable flexibility, cheaper implementation and avoid impairments due to tolerances of analogue components.

Additional advantageous features are described in the other claims.

BRIEF DESCRIPTION OF THE DRAWINGS

Principles and presently preferred examples of the invention are described below with reference to accompanying drawings, where.

Figure 1:
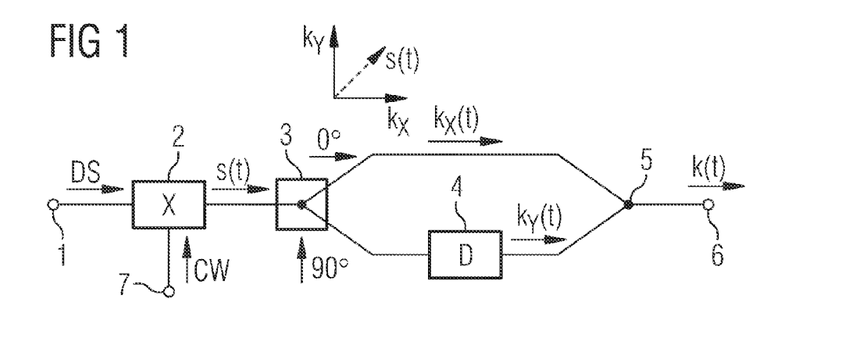
FIG. 1 shows a first simplified diagram of a transmitter with an optical delay.

FIG. 1 illustrates a simplified block diagram of a transmitter comprising a modulation unit 2 and a signal DGD pre-distortion unit 3-5 (DGD—differential group delay). A data signal DS (or a modulation signal derived from DS) is fed to an input 1 of the modulation unit 2 and modulated onto an optical carrier CW (continues wave) connected to input 7 of the modulation unit. The modulated optical signal s(t) is split by a polarisation beam splitter 3 into two orthogonal signal components $k_X$ and $k_Y$ (assuming linear polarisation and optimal performance, if the polarisation angle of s(t) is e.g. 45°, $k_X$ has a polarisation angle of 0°, $k_Y$ has a polarisation angle of 90°, and both signals amplitudes have equal power; non ideal splitting results in poorer performance). One of these signal components, e.g. $k_Y$, is delayed by a delay time "D" by an optical delay element 4. A delay of ¼ of a modulation section leads already to a considerable improvement, and a delay time about ½ of a modulation section leads to a very good result. Advantageously are also delay times of 1.5, 2.5, . . . modulation sections. The transmission signal component $k_X(t)$ and the delayed orthogonal transmission signal component $k_Y(t)$ are then combined by a combiner (splitter) 5 to a transmission signal k(t) and transmitted via a transmitter output 6 (the time variable "(t)" is sometimes omitted in the drawings).

Figure 2:
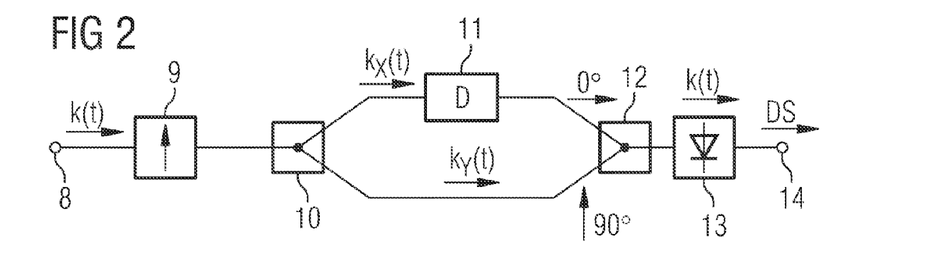
FIG. 2 shows a first simplified diagram of a receiver with an optical delay.

The DGD pre-distortion is compensated at the receiver by means of static DGD compensation elements or by existent adaptive filters. An appropriate receiver is shown in FIG. 2. A polarisation controller 9 receives the transmission signal k(t) and an output signal is fed to a polarisation beam splitter 10 which splits it into the orthogonal signal components $k_X(t)$ and $k_Y(t)$ (the same signals output by the transmitter; therefore the same reference signs are used for the transmitter and receiver signals). Now the other signal component $k_X(t)$ is delayed by an optical delay element 11, and then combined by a polarisation beam combiner 12 with the signal component $k_Y(t)$ (delayed in the transmitter). The regained signal s(t) is demodulated by a demodulation unit 13. The data signal DS is output at terminal 14.

Figure 3:
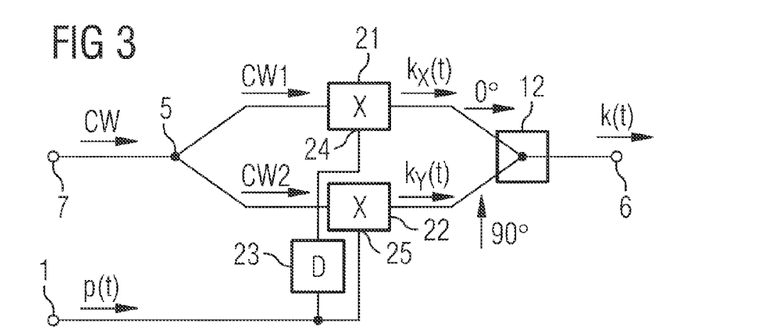
FIG. 3 shows a second simplified diagram of a transmitter with an electrical delay.

FIG. 3 shows another embodiment of a transmitter with two modulators 21 and 22, both receiving carrier signals CW1, CW2 derived by a splitter 5 (or polarisation beam splitter) from the same source generating a constant wave signal CW. Both carriers are separately modulated by a modulation signal p(t) derived from the data signal DS, but the modulation signal fed to modulator 21 is delayed by an electrical delay element 23. The modulated orthogonal signal components $k_X(t)$ and $k_Y(t)$ are combined by a polarisation beam combiner 12 to the transmission signal k(t). In all arrangements, a polarisation beam splitter/combiner may be substituted by a splitter/combiner and vice versa. Of course the polarisations of the signal components have to be considered and, if necessary, corrected.

Figure 4:
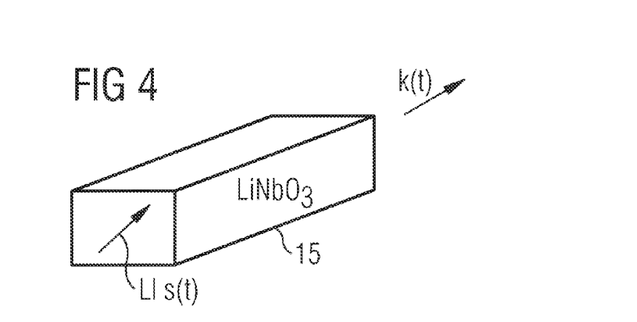
FIG. 4 shows a third simplified diagram of the transmitter with a PMD emulator.

FIG. 4 shows a PMD-emulator (PMD—polarisation mode dispersion) 15 generating the transmission signal k(t). A modulated light beam LI corresponding to the modulated optical signal s(t) is fed to the emulator made of a birefringent material, e.g. lithium niobate. The orthogonal components of the light beam LI are delayed by different amounts and the transmission signal k(t) comprising the orthogonal signal components $k_X(t)$ and $k_Y(t)$ is output. The delay time is controllable by applying an electrical field.

Figure 5:
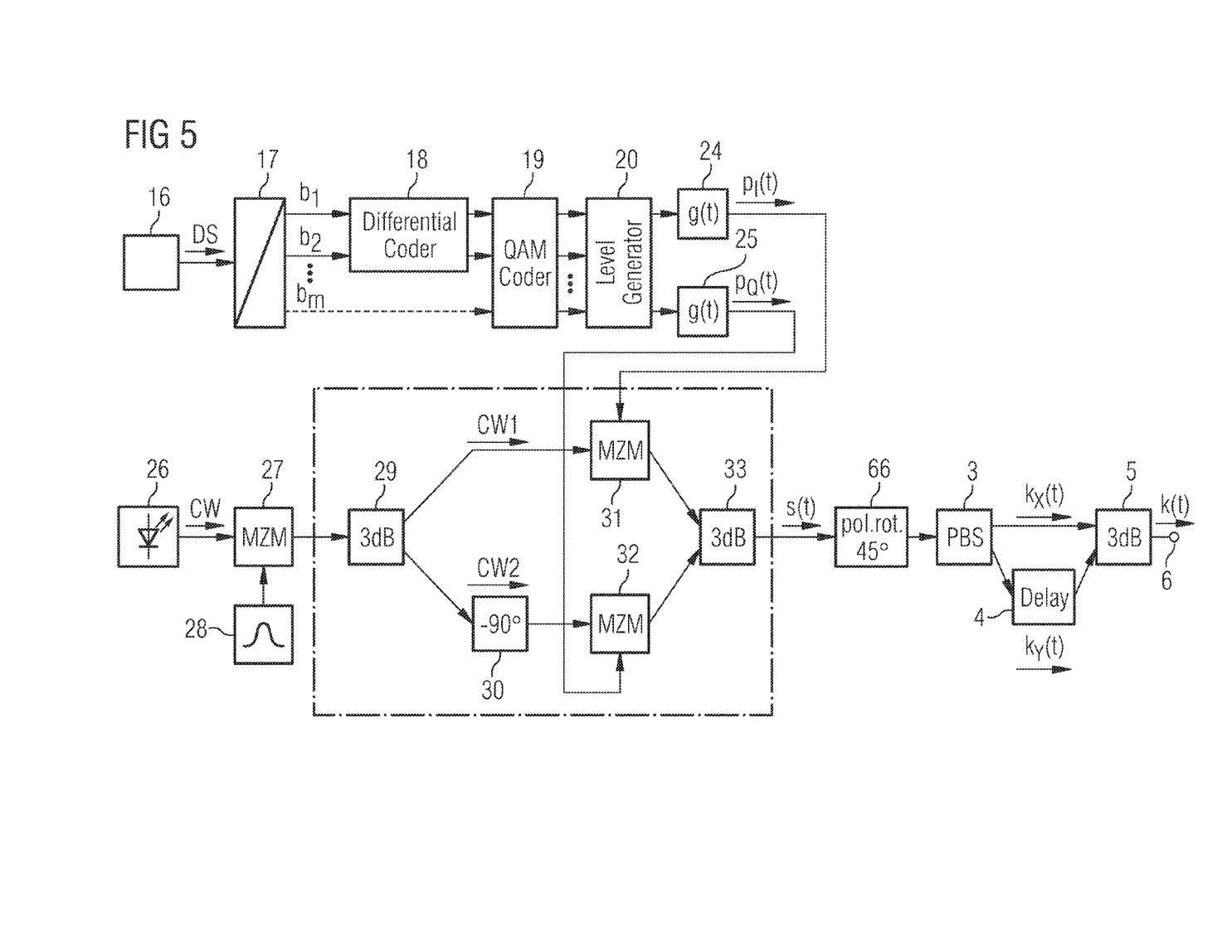
FIG. 5 shows a block diagram of a QAM transmitter with an optical delay.

FIG. 5 shows a more detailed diagram of a transmitter generating a QAM-signal (quadrature amplitude modulation). A data source 16 generates the data signal DS which is fed to a serial/parallel converter 17. The parallel data bits $b_1$-$b_m$ are optionally coded in e.g. differential coders—only one coder 18 is shown—and then coded in a QAM-coder 19. A level generator 20 outputs complex data values, in this embodiment separately real values I (in phase values) and imaginary values Q (quadrature values). The signal values I, Q are converted into electrical modulation signals $p_I(t)$ and $p_Q(t)$ by signal converters 24, 25 and fed to optical modulators 31 and 32 respectively. Optical carrier signals CW1, CW2 are generated by a CW generator (laser) 26, in this embodiment shaped by an impulse carver 27, split and then fed to the modulators 31 and 32. One of the carrier signals or one of the modulated signals is phase shifted by a phase shifter 30. The modulated signals output by the modulators are combined to a modulated optical signal s(t) (the same reference signs are used for equivalent signals relating to the invention). This signal s(t) is then treated in the same way as shown in FIG. 1. First, s(t) is rotated by a polarisation rotator 66 (if not already done by rotating the components). Then s(t) is split by the polarisation beam splitter 3 into two orthogonal signal components according FIG. 1 (both orthogonal signal components having preferable equal power), one signal component $k_Y(t)$ is delayed and then both signal components $k_X(t)$, $k_Y(t)$ are combined to the transmission signal k(t). This figure shows the application of the invention in combination with a real transmitter. The described method may be also applied when k(t) is a polarisation multiplex signal $s_X(t)+s_Y(t)$ ($s_X$, $s_Y$—orthogonal vectors) shown in FIG. 7.

Figure 6:
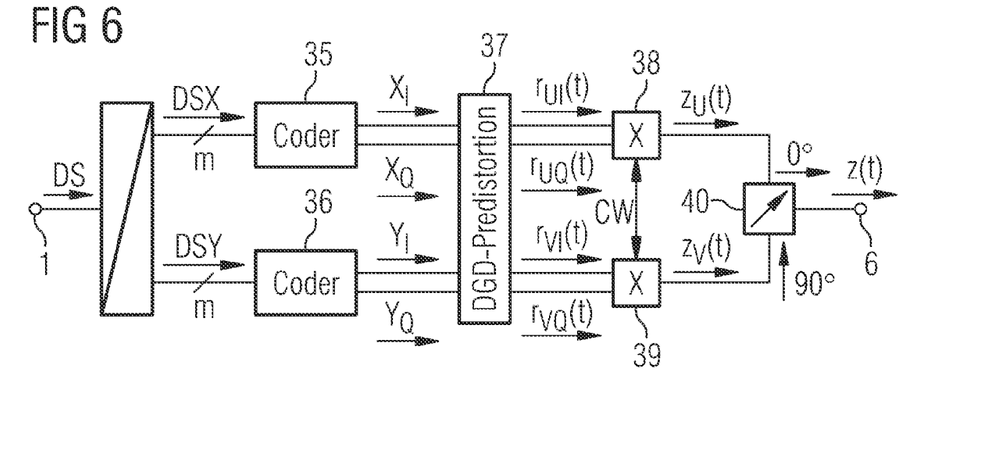
FIG. 6 shows a simplified block diagram of a general polmux transmitter.

FIG. 6 shows a simplified block diagram of a digital polmux transmitter. The transmitter comprises a first coder 35 and a second coder 36. The data signal DS is split into a first data signal DSX coded by the first coder 35 and a second data signal DSY is coded by the second coder 36.

Complex signal values $X_I$, $X_Q$ are output by the first coder and complex signal values $Y_I$, $Y_Q$ are output from the second coder. The complex signal values are converted by a conversion unit 37 into DGD pre-distortion modulation signals $r_{UI}$, $r_{UQ}$ and $r_{VI}$, $r_{VQ}$; both pairs of complex modulation signals modulating the allocated optical carrier CW. The DGD pre-distortion may be executed before or after the conversion into electrical modulation signals.

Figure 7:
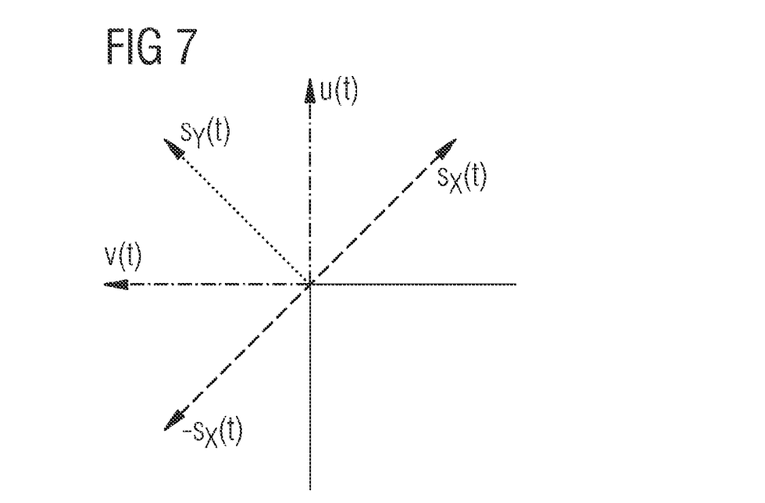
FIG. 7 shows a polarisation diagram of optical signals at the polmux transmitter.

FIG. 7 shall explain how an adequate polmux transmission signal z(t) is generated. It is assumed that $s_X(t)$ and $s_Y(t)$ are orthogonal modulated optical signals generated by a standard polmux system. These signals $s_X(t)$ and $s_Y(t)$ are converted into a new pair of orthogonal component signals, a "vertical" component signal u(t) and an orthogonal "horizontal" component signal v(t) (of course the coordinates are arbitrarily).

Assuming linear polarisation of the orthogonal signals $s_X(t)$ and $s_Y(t)$, these signals are preferable rotated preferable by 45° to receive optimized performance and their vertical (u-polarisation) and their horizontal (v-polarisation) polarized component signals are constructed according to $$\begin{pmatrix} u(t) \\ v(t) \end{pmatrix} = \frac{1}{C}\begin{pmatrix} 1 & 1 \\ -1 & 1 \end{pmatrix}\begin{pmatrix} s_X(t) \\ s_Y(t) \end{pmatrix} = \frac{1}{C}\begin{pmatrix} s_X(t) + s_Y(t) \\ -s_X(t) + s_Y(t) \end{pmatrix} \quad (1)$$

or generated by an equivalent arrangement; C—constant value. Then one of the new orthogonal component signals u(t) or v(t), each comprising signal components of the signals $s_X(t)$ and $s_Y(t)$ with the same polarisation, is pre-delayed $$\begin{pmatrix} z_u(t) \\ z_v(t) \end{pmatrix} = \begin{pmatrix} u(t) \\ v(t-D) \end{pmatrix} \quad (2)$$

and the orthogonal "transmission signal components" $z_U(t)$ and $z_V(t)$ are combined to a polarisation multiplex transmission signal z(t) according to our invention. This mathematical operation may be executed in the optical domain using commercially availably components. But it is advantageous to apply this method in the electrical or digital domain generating corresponding DGD pre-distortion component modulation signals. The component modulation signals generate the transmission signal components $z_U(t)$, $z_V(t)$ directly by modulating allocated carriers.

If DGD pre-distorted modulation signals are used, then the orthogonal transmission signals $s_X(t)$ and $s_Y(t)$ do not really exist at the transmitter side, but they are enclosed in the transmission signal components $z_U(t)$, $z_V(t)$ of the polmux transmission signal z(t). At the receiver side, the standard polmux signals or corresponding demodulated signals have to be reconstructed to regain the data signal.

According to the FIGS. 1-6 many different arrangements may be used for generating a DGD pre-distorted transmission signal. The invention is independent of coding or modulation, e.g. QAM, OFDM, PSK, DPSK, ASK, or combinations thereof may be applied for single polarisation and polarisation multiplex signals.

It is of course advantageous to generate the pre-delayed polmux signal by manipulating the electrical modulation signals or even by digital calculations.

Figure 8:
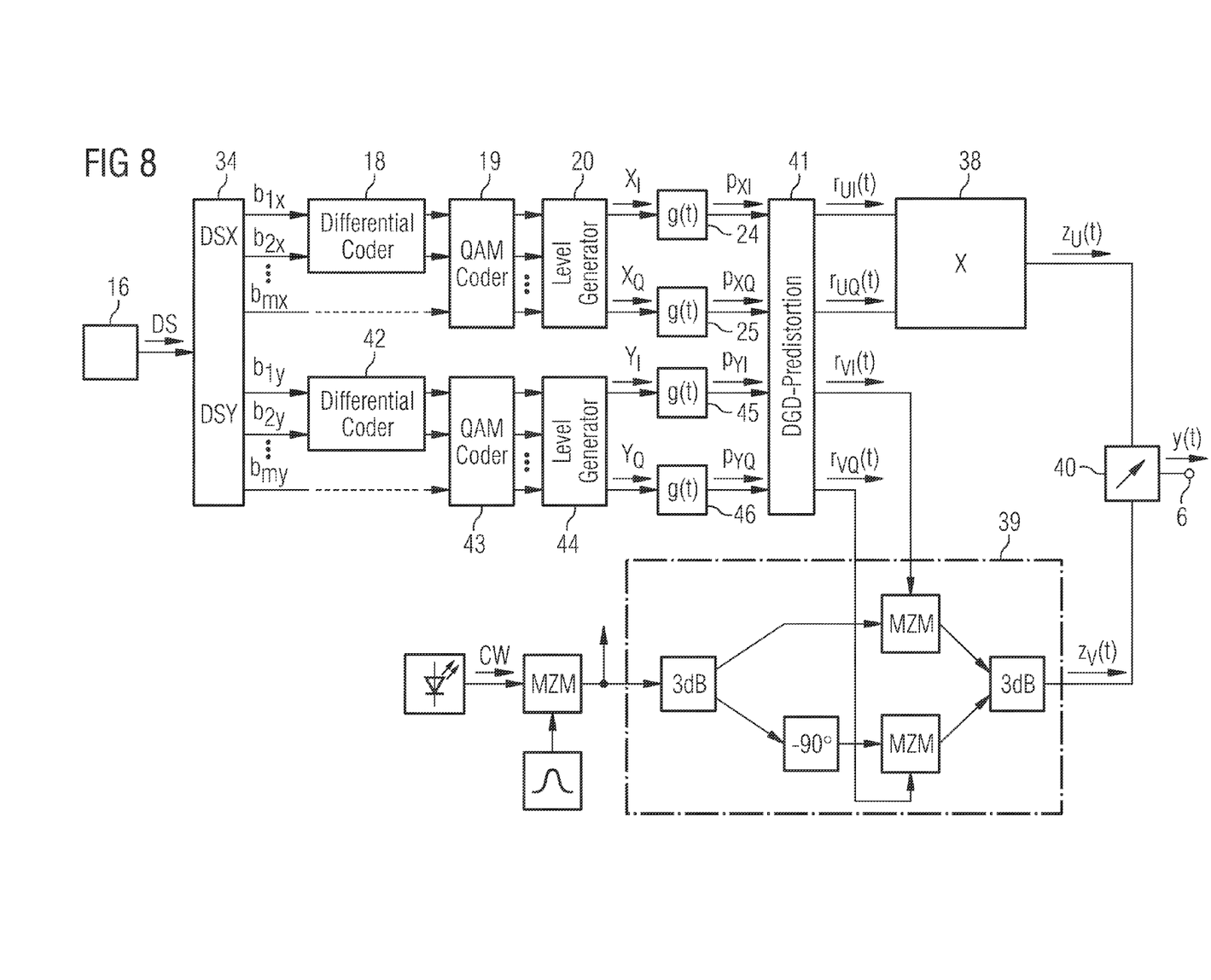
FIG. 8 shows a block diagram of a QAM polmux transmitter with an electrical DGD pre-distortion.

FIG. 8 shows a more detailed polmux transmitter block diagram with electrical DGD pre-distortion. The data signal DS is split into two groups of parallel signals DSX=$b_{1X}$-$b_{mX}$ and DSY=$b_{1Y}$-$b_{mY}$. The first group DSX is separately coded in a coding arrangement 18-20 shown in FIG. 5 and described before. The second group DSY is coded in a second identical coding arrangement 42-44. Each group of parallel signals is output as a pair of complex values $X_I$, $X_Q$ and $Y_I$, $Y_Q$ and converted into electrical modulation signals $p_{XI}$, $p_{XQ}$ and $p_{YI}$, $p_{YQ}$ by signal converters 24, 25 and 45, 46 respectively. The electrical modulation signals are DGD pre-distorted and converted into component modulation signals $r_{UI}(t)$, $r_{UQ}(t)$ and $r_{VI}(t)$, $r_{VQ}(t)$ by the DGD pre-distortion unit 41 according the equations (1) and (2). The first orthogonal transmission signal component $z_U(t)$ is generated by the upper modulator 38 and the second orthogonal transmission signal component $z_V(t)$ is output from the lower modulator 39. These signals are combined to the polmux transmission signal z(t).

Figure 9:
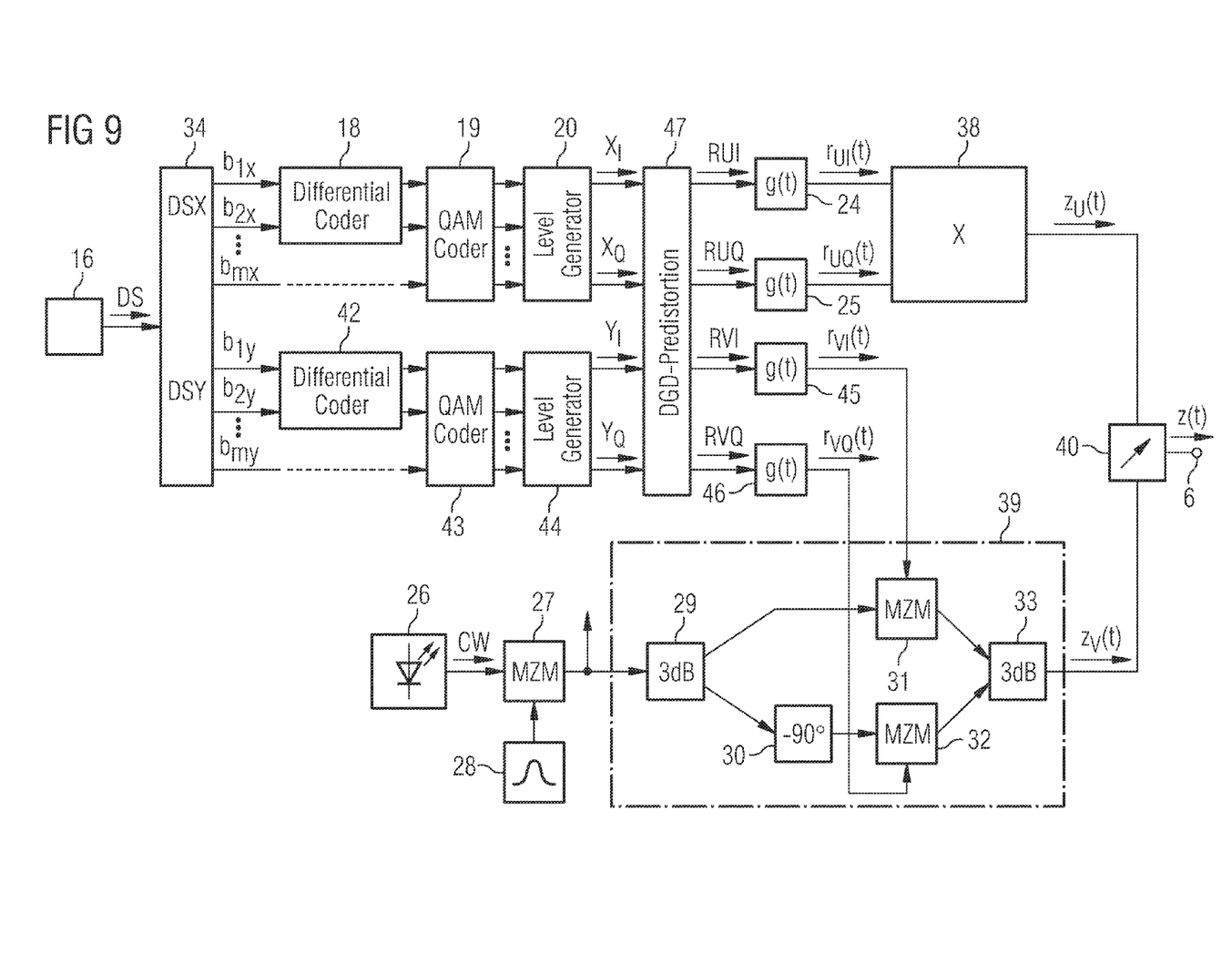
FIG. 9 shows a block diagram of a QPSK polmux transmitter with a digital DGD pre-distortion.

FIG. 9 shows another embodiment of a polmux transmitter with digital DGD-pre-distortion. A digital DGD pre-distortion unit 47 is inserted between the level generators 20, 44 and the signal converters 24, 25 and 45, 46. The signal values $X_I$, $X_Q$ and $Y_I$, $Y_Q$ output by the level generators 20 and 44 are converted into component modulation values RUI, RUQ and RVI, RVQ according the equations (1) and (2) by digital calculation and then converted into the component modulation signals $r_{UI}(t)$, $r_{UQ}(t)$ and $r_{VI}(t)$, $r_{VQ}(t)$. The component modulation signals generate the orthogonal transmission signal components $z_U(t)$ and $z_V(t)$.

Figure 10:
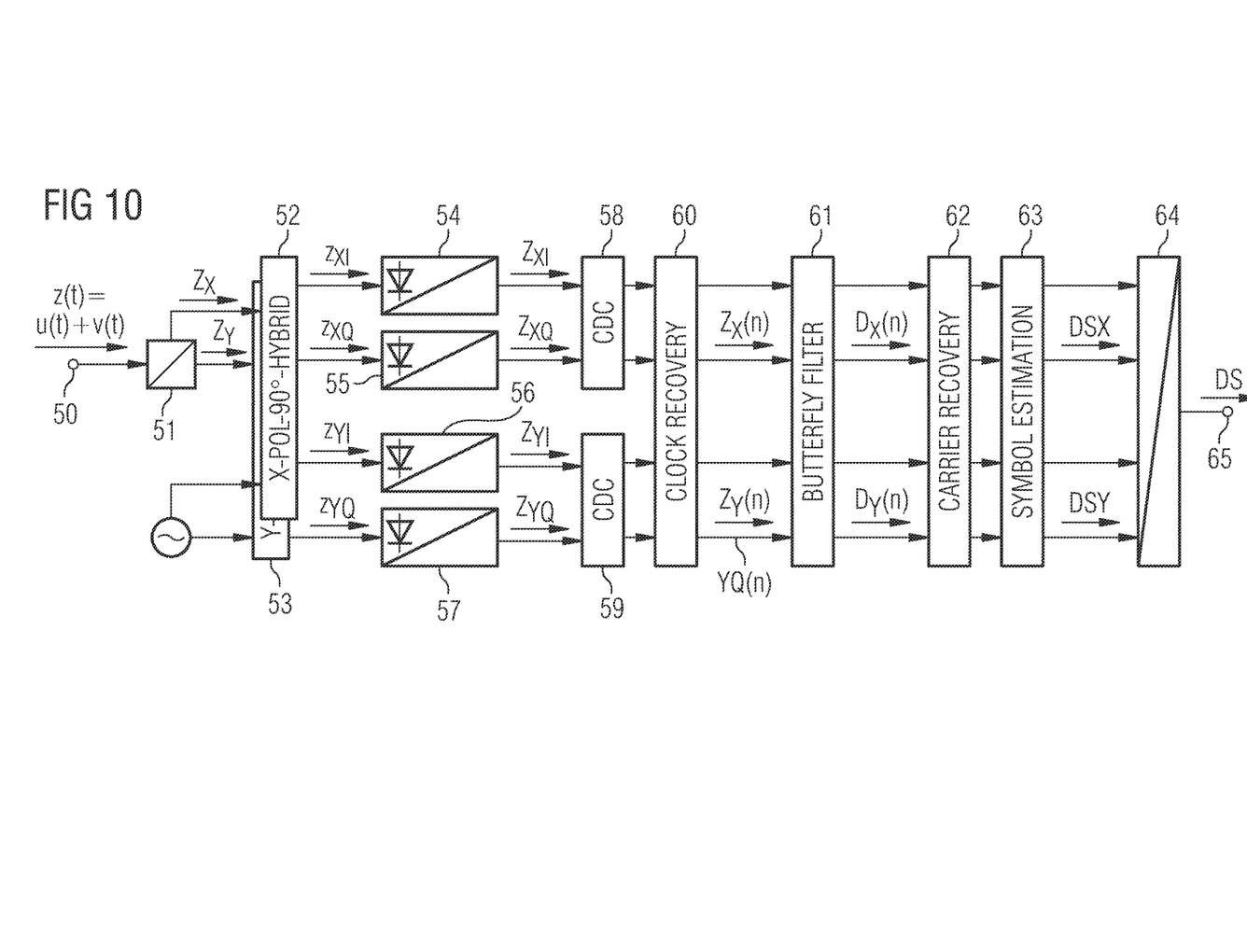
FIG. 10 shows a diagram of a polmux receiver.

FIG. 10 shows a coherent receiver for a polmux system which is transmitting two orthogonal optical signals $z_u(t)$ and $z_V(t)$ according to the invention. The arrangement of the receiver is well known to those skilled in the art. The receiver is implemented for coherent demodulation to allow digital processing of complex sample values and therefore the reconstruction of the original information independent of the polarisation of the received signals. The transmission signal z(t) (ignoring impairments) is received at the input 50 of a polarisation beam splitter 51. The transmission signal comprises the orthogonal optical transmission signal components $z_U(t)$ and $z_V(t)$ which carry information derived from the data signals DSX and DSY (FIG. 8, FIG. 9). Because the transmission signal z(t) is received with an unknown polarisation it is split into a x-polarisation signal $z_x(t)$ and an orthogonal y-polarisation signal $z_y(t)$. Both signals are fed to 90°-hybrids 52 and 53 respectively. The x-polarisation 90°-hybrid outputs a real and an imaginary x-polarisation component signal $z_{XI}$, $z_{XQ}$ and the y-polarisation 90°-hybrid outputs a real and an imaginary y-polarisation component signal $z_{YI}$, $Z_{YQ}$. These signals are converted into electrical signals, sampled and output by analogue-digital converters 54-57 as pairs of complex values $Z_{XI}$, $Z_{XQ}$ and $Z_{YI}$, $Z_{YQ}$ respectively. After passing chromatic dispersion compensation (CDC) 58 and 59 and a clock recovery 60, the complex component values $Z_X(n)=Z_{XI}$, $Z_{XQ}$ and $Z_Y(n)=Z_{YI}$, $Z_{YQ}$ (n=time instant) are fed to a four dimensional MIMO (multiple input-multiple output) filter 61, here denoted as butterfly filter, for reconstructing data values $D_X(n)$ and $D_Y(n)$ of the data signals DSX and DSY respectively. A carrier recovery 62 is necessary for control purposes. The symbol estimation unit 63 receives the complex data values $D_X(n)$ and $D_Y(n)$ and outputs the data signals DSX and DSY which are then multiplexed by a parallel-serial converter 64 to the data signal DS which is output at the receiver output 65.

Figure 11:
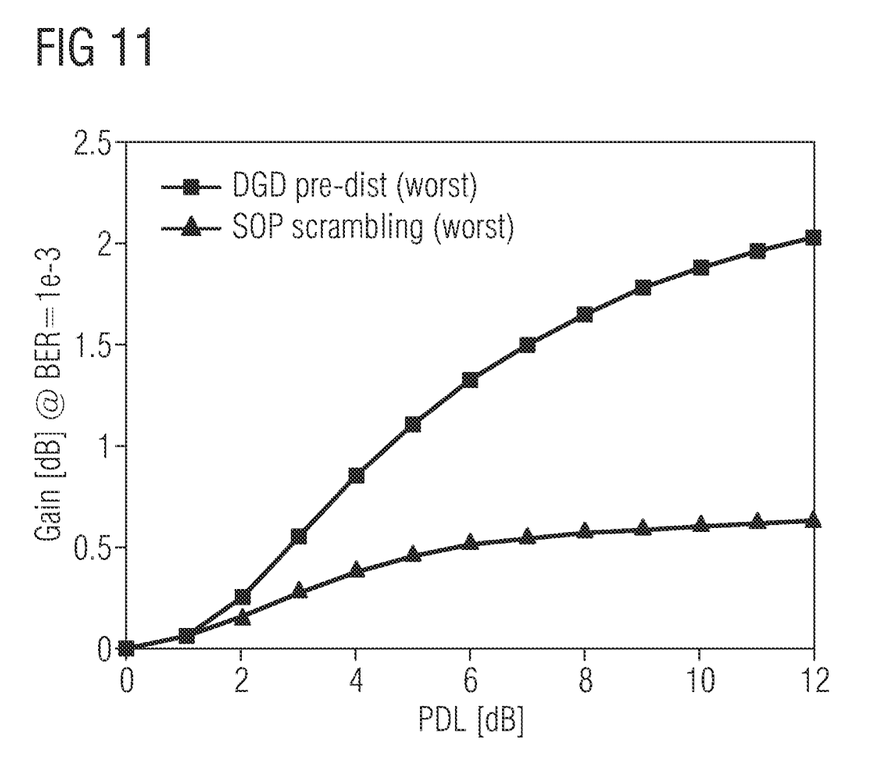
FIG. 11 shows the performance improvement of the proposed method.

FIG. 11 shows the improvement for a QAM transmission system with DGD pre-distortion compared with SOP scrambling, assuming negligible nonlinearities in the optic channel, as well as a lumped additive white Gaussian noise source at the receiver.

The present invention is not limited to the details of the above described principles. The scope of the invention is defined by the appended claims and all changes and modifications as fall within the equivalents of the scope of the claims are therefore to be embraced by the invention. Adequate mathematical conversions or adequate calculations and adequate and non ideal generation of the transmission signal components are also incorporated.

REFERENCE SIGNS 1 transmitter input
2 modulation unit 3 polarisation beam splitter
4 optical delay element
5 combiner
6 transmitter output
7 CW input
8 receiver input
9 polarisation controller
10 polarisation beam splitter
11 optical delay element
12 polarisation beam combiner
13 demodulation unit
14 receiver output
15 PMD emulator
16 data source
17 serial-parallel converter
18 differential coder
19 QAM coder
20 level generator
21 first modulation unit
22 second modulation unit
23 electrical delay element
24 signal converter
25 signal converter
26 CW generator
27 pulse modulator
28 pulse carver
29 splitter
30 phase shifter (delay)
31 modulator
32 modulator
33 combiner (splitter)
34 serial-parallel converter
35 first coder
36 second coder
37 DGD pre-distortion
38 first modulation unit
39 second modulation unit
40 (polarisation beam) combiner
41 electrical pre-distortion unit
42 differential coder
43 QAM coder
44 level generator
45 signal converter
46 signal converter
50 receiver input
51 polarisation beam splitter
52 x-polarisation hybrid
52 y-polarisation hybrid
54-57 analogue-digital-converter
58, 59 chromatic dispersion compensator
60 clock recovery
61 butterfly filter
62 carrier recovery
63 symbol estimation unit
64 parallel-serial-converter
65 receiver output
66 polarisation rotator
DS digital data signal
CW carrier signal (constant wave)
D delay time
s(t) modulated optical signal
$k_X(t)$ x-polarisation signal component
$k_Y(t)$ y-polarisation signal component
k(t) transmission signal
LI light beam
XI real signal value (in phase)
XQ imaginary signal value (quadrature)

CW1 first carrier signal
CW2 second carrier signal
g(t) conversion function
$p_I(t)$ modulation signal
$p_Q(t)$ modulation signal
DSX first data signal
DSY second data signal
$X_I$ real signal values of DSX
$X_Q$ imaginary signal values of DSX
$Y_I$ real signal values of DSY
$Y_Q$ imaginary signal values of DSY
RUI real u-component modulation value
RUQ imaginary u-component modulation value
RVI real v-component modulation value
RVQ imaginary v-component modulation value
$p_{XI}$ real x-component modulation signal
$p_{XQ}$ imag. x-component modulation signal
$p_{YI}$ real y-component modulation signal
$p_{YQ}$ imag. y-component modulation signal
$r_{UI}(t)$ real (u-polarisation) DGD pre-distorted component modulation signal
$r_{UQ}(t)$ imaginary (u-polarisation) DGD pre-distorted component modulation signal
$r_{VI}(t)$ real (v-polarisation) DGD pre-distorted component modulation signal
$r_{VQ}(t)$ imaginary (v-polarisation) DGD pre-distorted component modulation signal
$s_X(t)$ (x-polarisation modulated) signal
$s_Y(t)$ (Y-polarisation) modulated) signal
u(t) vertical signal component
v(t) horizontal signal component
$z_u(t)$ first orthogonal transmission signal component
$z_v(t)$ second orth. transmission signal component
z(t) polmux transmission signal
$z_X$ x-polarisation component signal
$z_Y$ y-polarisation component signal
$Z_{XI}$ real x-polarisation component value
$Z_{XQ}$ imaginary x-polarisation component value
$Z_{YI}$ real x-polarisation component value
$Z_{YQ}$ imaginary x-polarisation component value
$Z_X(n)$ complex x-polarisation component value
$Z_Y(n)$ complex y-polarisation component value
n time instant

The invention claimed is:
1. Method for transmitting an optical transmission signal Z(t) with reduced polarisation-dependent loss comprising:
generating a first transmission signal component $Z_U(t)$ and a second transmission signal component $Z_V(t)$ of the optical transmission signal Z(t) wherein $Z_V(t)$ and $Z_U(t)$ are orthogonal,
using the following pre-delaying step

$$\begin{pmatrix} Zu(t) \\ Zv(t) \end{pmatrix} = \begin{pmatrix} u(t) \\ v(t-D) \end{pmatrix},$$

wherein D is a time difference between said first and second transmission signal components $Z_U(t)$, $Z_V(t)$,
wherein u(t) and v(t) are derived or derivable from orthogonal signals $S_X(t)$ and $S_Y(t)$ by a step of rotation according to the following relationship:

$$\begin{pmatrix} u(t) \\ v(t) \end{pmatrix} = R \begin{pmatrix} Sx(t) \\ Sy(t) \end{pmatrix}$$

where $S_X(t)$ and $S_Y(t)$ are signals that are orthogonally polarisation multiplexed and modulated according to first and second data signals, respectively, and R is a rotation matrix representing a rotation by a fixed angle, wherein said rotation and said pre-delaying are carried out either in the optical domain, or in the electrical or digital domain, by corresponding differential group delay predistortion component modulation signals for generating said transmission signal components $Z_U(t)$, $Z_V(t)$ directly by modulating allocated carriers, and transmitting the optical transmission signal Z(t) with the time difference of D between $Z_U(t)$ and $Z_V(t)$.

2. The method according to claim 1, wherein the first and second transmission signal components of the transmission signal are transmitted with equal power.

3. The method according to claim 1, wherein the first and second transmission signal components are transmitted with a time delay of one half of a modulation section or one half of a modulation section and an integer multiple of a modulation section between the orthogonal transmission signal components.

4. The method according to claim 1, wherein the optical transmission signal is amplitude, quadrature amplitude, frequency or phase modulated, or a combination thereof, or an orthogonal frequency division multiplex signal.

5. The method according to claim 1, wherein the first transmission signal component and the second transmission signal component of the transmission signal are generated by differential group delay (DGD) predistorted electrical component modulation signals derived from component modulation signals.

6. The method according to claim 1, wherein the method further comprises coding a first data signal to yield a first pair of values of a first complex value and coding a second data signal to yield a second pair of values of a second complex value;

the complex values are converted into (differential group delay) DGD pre-distorted component modulation values, wherein said DGD pre-distorted component modulation values are converted into DGD pre-distorted electrical component modulation signals, and the first transmission signal component and the second transmission signal component of the optical transmission signal are generated by said electrical DGD pre-distorted component modulation signals.

7. The method according to claim 1, wherein at a receiver the time difference between orthogonal transmission signal components of a received optical polarisation multiplex transmission signal is compensated to achieve reconstructed polarisation multiplex signal components.

8. The method according to claim 7, wherein the received polarisation multiplex signal transmission signal is coherently demodulated and sampled, and the time difference of the orthogonal signal components represented by complex data signal values is compensated.

9. The method according to claim 8, wherein a butterfly filter is used for compensation of the time difference between the orthogonal transmission signal components of the transmission signal and for reconstructing transmitted data signals.

10. The method of claim 1, wherein said fixed rotation angle is an angle of 45°, and said rotation matrix R is defined as $$R = \frac{1}{C}\begin{pmatrix} 1 & 1 \\ -1 & 1 \end{pmatrix},$$

wherein C is a constant.

11. An arrangement for transmitting an optical signal with reduced polarisation-dependent loss comprising:

a transmission signal component generator for generating a first transmission signal component $Z_U(t)$ and a second transmission signal component $Z_V(t)$ of the optical transmission signal Z(t) wherein $Z_V(t)$ and $Z_U(t)$ are orthogonal, using the following pre-delaying step $$\begin{pmatrix} Zu(t) \\ Zv(t) \end{pmatrix} = \begin{pmatrix} u(t) \\ v(t-D) \end{pmatrix},$$

wherein D is a time difference between said first and second transmission signal components $Z_U(t)$, $Z_V(t)$, wherein u(t) and v(t) are derived or derivable from orthogonal signals $S_X(t)$ and $S_Y(t)$ by a step of rotation according to the following relationship:

$$\begin{pmatrix} u(t) \\ v(t) \end{pmatrix} = R \begin{pmatrix} Sx(t) \\ Sy(t) \end{pmatrix}$$

where $S_X(t)$ and $S_Y(t)$ are signals that are orthogonally polarisation multiplexed and modulated according to first and second data signals, respectively, and R is a rotation matrix representing a rotation by a fixed angle, wherein said rotation and said pre-delaying are carried out either in the optical domain, or in the electrical or digital domain, by corresponding differential group delay predistortion component modulation signals for generating said transmission signal components $Z_U(t)$, $Z_V(t)$ directly by modulating allocated carriers, and a combiner for combining the first transmission signal component $Z_U(t)$ and the second transmission signal component $Z_V(t)$ to produce the optical transmission signal Z(t) with the time difference D between $Z_U(t)$ and $Z_V(t)$.

12. An arrangement for receiving a signal Z(t) transmitted by the arrangement of claim 11, comprising:

means for constructing data values; and means for reconstructing said first and second data signals.

* * * * *